(12) United States Patent
Chao et al.

(10) Patent No.: US 6,845,322 B1
(45) Date of Patent: Jan. 18, 2005

(54) METHOD AND SYSTEM FOR DISTRIBUTED NAVIGATION

(75) Inventors: Yi-Chung Chao, Fremont, CA (US); Robert Rennard, San Martin, CA (US); Haiping Jin, San Jose, CA (US)

(73) Assignee: Televigation, Inc., Sunnyvale, CA (US)

( * ) Notice: Subject to any disclaimer, the term of this patent is extended or adjusted under 35 U.S.C. 154(b) by 0 days.

(21) Appl. No.: 10/619,974

(22) Filed: Jul. 15, 2003

(51) Int. Cl.[7] .......................... G01C 21/30; G01C 21/32
(52) U.S. Cl. .................... 701/209; 340/995; 342/357.1; 709/200
(58) Field of Search ................................. 701/208, 209, 701/210, 200, 211, 202; 340/995.14, 995.12, 990, 995.19, 995; 342/357.1; 709/219, 200

(56) References Cited

U.S. PATENT DOCUMENTS

| | | | | |
|---|---|---|---|---|
| 2001/0005809 A1 | * | 6/2001 | Ito | 701/210 |
| 2001/0029425 A1 | * | 10/2001 | Myr | 701/200 |
| 2001/0037305 A1 | * | 11/2001 | Mochizuki | 705/52 |
| 2001/0056443 A1 | * | 12/2001 | Takayama et al. | 707/513 |
| 2002/0103599 A1 | * | 8/2002 | Sugiyama et al. | 701/211 |
| 2003/0028314 A1 | * | 2/2003 | Nagamune | 701/202 |
| 2003/0033083 A1 | * | 2/2003 | Nakashima et al. | 701/211 |
| 2003/0078726 A1 | * | 4/2003 | Fukushima et al. | 701/209 |
| 2003/0083807 A1 | * | 5/2003 | Kuroda et al. | 701/202 |
| 2003/0187573 A1 | * | 10/2003 | Agnew et al. | 701/201 |
| 2003/0220735 A1 | * | 11/2003 | Nimura | 701/208 |
| 2003/0236818 A1 | * | 12/2003 | Bruner et al. | 709/200 |
| 2004/0030493 A1 | * | 2/2004 | Pechatnikov et al. | 701/208 |
| 2004/0030495 A1 | * | 2/2004 | Draeger et al. | 701/209 |
| 2004/0039523 A1 | * | 2/2004 | Kainuma et al. | 701/208 |

* cited by examiner

Primary Examiner—Thomas G. Black
Assistant Examiner—Tuan C To
(74) Attorney, Agent, or Firm—Irene Y. Hu

(57) ABSTRACT

Method and system for a distributed navigation system. The system comprises a client integrated with a mobile communication device (e.g. PDA, cellular telephone, etc.) and a server communicating via wireless carriers and the Internet. In one embodiment, the server obtains a user's initial position, a user-designated destination, and calculates a nominal route from the user's initial position to the destination. If a deviation from the nominal route is detected, the reroute tasks are divided between the server and the client according to a corridor area surrounding the nominal route. Mapping information related to the corridor area is stored in the client, and the amount of the stored mapping information depends on the storage and/or processing capabilities of the client.

49 Claims, 5 Drawing Sheets

METHOD AND SYSTEM FOR DISTRIBUTED NAVIGATION

CROSS-REFERENCE TO RELATED APPLICATIONS

This application relates to issued U.S. patent application Ser. No. 6,266,615 entitled "Method And System For An Interactive And Real-Time Distributed Navigation System" by HaiPing Jin, issued on Jul. 24, 2001, and to co-pending U.S. patent application Ser. No. 10/408,325, entitled "Method and System For Prediction-Based Distributed Navigation", by Chao et al., filed on Apr. 8, 2003, herein incorporated in their entirety by reference.

BACKGROUND INFORMATION

1. Field of Invention

The present invention relates generally to navigation systems and location-based information delivery, and more particularly, to a method and system for a distributed navigation system wherein a client and a server communicate to carry out distributed navigation tasks.

2. Description of Related Art

Presently, a rapid growth in technological fields such as the personal digital assistant (PDA) and cellular telephones has fueled consumer interest in products that provide on-call real-time guidance and communication. One such technological advance is a navigation system that allows its users to reach destinations by providing turn-by-turn instructions along a calculated route.

Conventional navigation systems are typically satellite-based Global Positioning System (GPS) devices which have been incorporated into automobile navigation systems, for additional information regarding conventional navigation systems, refer to U.S. Pat. Nos. 5,938,720, 5,928,307, 5,922,042, 5,912,635, 5,910,177, 5,904,728, 5,902,350, all incorporated herein by reference. Such conventional automobile navigation systems, however, are expensive and inconvenient to use. Therefore, there is a need to incorporate navigation capabilities so that a user may access real-time turn-by-turn route instructions via personal handheld devices such as a wireless cellular phone or a personal digital assistant (PDA) device.

Several technical obstacles prevent efficient use of navigation systems incorporated into personal handheld devices. One such obstacle is the amount of geographic data needed to provide reasonably detailed navigational information. Small handheld devices comprise limited embedded memory that may not be adequate for storing a large amount of geographic information essential for navigational purposes. This obstacle can be overcome in a distributed navigation system comprising a server-client structure, wherein the navigation functions are partitioned and assigned among one or more distributed servers and the handheld device or client.

Due to limited client memory capacity, conventional distributed navigation systems assign a majority of nominal route calculation tasks to the server, and allocate rerouting calculations almost exclusively to the server. In order to retrieve and display navigation information to the user, the client must frequently communicate with the server. Such constant communication may be time consuming and the information may be inaccurate due to communication delays. Furthermore, the capacities and capabilities of handheld devices or clients are diverse and evolve over time, some devices comprise adequate memory capacity to carry out partial or complete reroute tasks independently of the server.

SUMMARY OF THE INVENTION

The present invention provides a method and system for a distributed navigation system. The system comprises a client integrated with a mobile communication device (e.g. PDA, cellular telephone, etc.) and a server communicating via wireless carriers and the Internet.

In one embodiment, the server obtains a user's initial position via the client and proceeds to calculate a nominal route to a user-designated destination. The server then sends navigation information to the client and the client displays turn-by-turn navigation instructions to the user. Moreover, while the user is traveling from the initial position to the destination, the client periodically queries the user's position with positioning techniques such as the Global Positioning System (GPS). If a deviation from the nominal route is detected, the server and/or the client recalculate a new route from the user's current position to the destination. Rerouting task assignment between the server and the client may vary according to the memory and/or processing capabilities of the client and a predetermined "corridor" area surrounding the nominal route may be used to determine the reroute task division.

In a second embodiment, in addition to dynamic reroute task division between the server and the client, communication between the client and the server may be initiated by event triggers such as periodic weather updates, advertisements from local vendors, and traffic updates. The client processes information retrieved from the server during such event triggered communication and may present the user with a reroute option.

The present invention reduces excessive reroute communication between the client and the server in a distributed navigation system by storing additional corridor mapping information in the client. The reduced communication between the client and the server further diminishes possible reroute errors caused by communication delays. Moreover, the amount of additional corridor information stored in the client is dynamic and may depend on factors such as the client's storage and/or processing capabilities.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments not necessarily enumerated herein. Thus, the present invention is not intended to be limited to the embodiments shown but is to be accorded the widest scope consistent with the principles and features described herein.

A key component of a navigation system is the determination of the location (or position) of a user. It is intended that the term location referred to herein comprises a geographic location or geographic information relating to the position of an object. A location may contain three-dimensional information that completely defines the exact position of an object. In some additional embodiments, a location may contain information that is not sufficient to completely define the position of an object. Broadly defined, as used herein, a location also may include speed, time, direction of movement, etc. of an object.

One skilled in the art would appreciate that the format with which a location is expressed is not critical to some embodiments of the invention. For example, in some embodiments, location information is presented in the format of (x, y), where x and y are two ordinates that define the geographic location, i.e., a position of a user. In an alternative embodiment, location information is presented by longitude and latitude related information. In another embodiment of the present invention, the location information also includes a velocity element comprising a speed component and a heading component.

Figure 1:
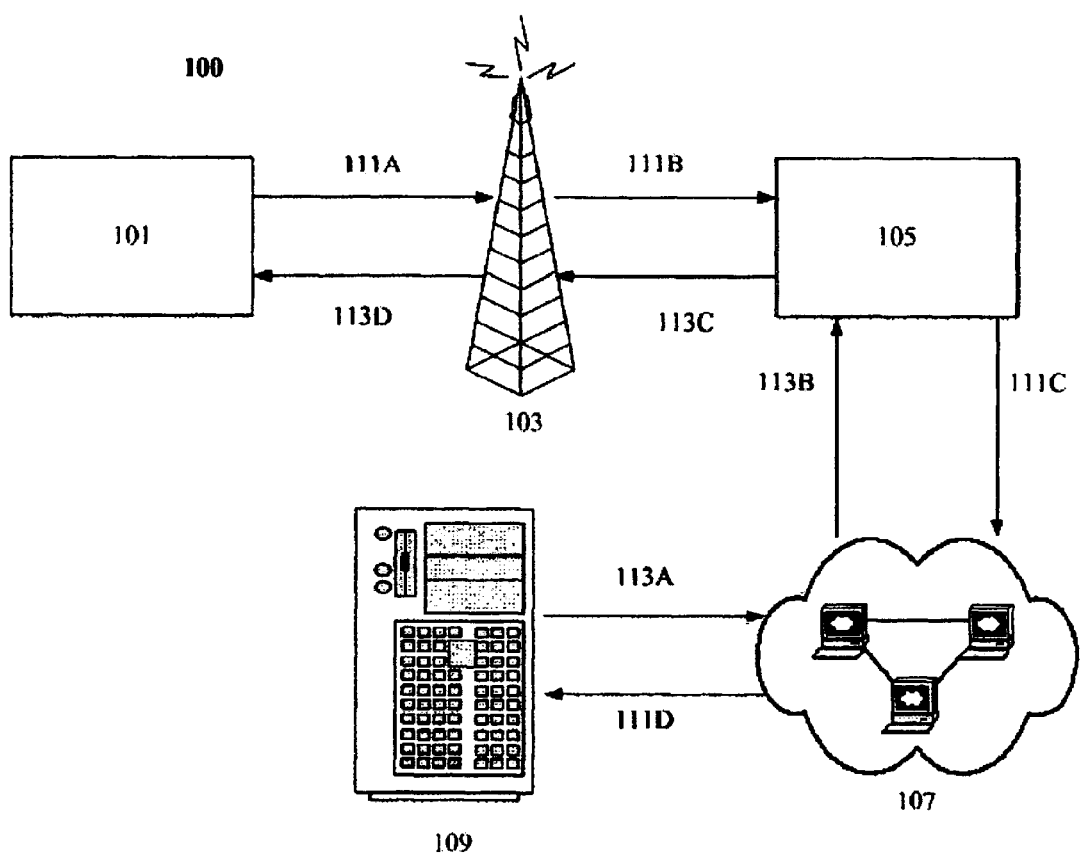
FIG. 1 is an architectural diagram illustrating an embodiment of an interactive real-time distributed navigation system.

FIG. 1 shows an architecture for an interactive real-time distributed navigation system in accordance to one embodiment of the present invention. The various components and their interaction will now be described. Wireless device 101 may take the form of a cellular telephone, satellite telephone, wireless Personal Digital Assistant (PDA), personal computer or other suitable device having wireless communications capability. Wireless device 101 is equipped with positioning capability that takes the form of, for example, Global Positioning Systems (GPS), Enhanced 911 (E911), or some other positioning systems as they become available. One skilled in the art will appreciate that the present invention is not limited to any particular positioning technology. In one embodiment, wireless device 101 is manufactured with built-in positioning capabilities.

Wireless device 101 need not carry map information, or may carry some map information, depending on the designed storage capability of the wireless device 101. Such a system is described as a distributed system and will be further discussed below.

In one embodiment, the capabilities of wireless device 101 are enhanced through interfacing with modular attachments. A major function of wireless device 101 is to provide an interface between the invention and a user. Furthermore, as will be described more fully below, wireless device 101 provides a user interface for displaying graphical, textual or audible information. The user interface incorporates the user's sensory capabilities within the invention, allowing the user to interact with electromechanical components of the invention, such as by allowing the user to relay and receive location information by means of audible signals, voice, or audiovisual, graphical, or combination thereof of location information displayed or transmitted on wireless device 101. Where a text-displaying device is used, enhanced performance is achieved through wireless device 101 displaying several lines of text.

In another embodiment comprising an enhanced video display, wireless device 101 displays maps and enhanced directional information. In another embodiment, wireless device 101 is directionally oriented through gyroscopic or geomagnetical enhancements allowing wireless device 101 or server to provide real time location and orientation information. One skilled in the art realizes that many more implementations are possible for wireless device 101 without deviating from the teachings of this invention.

As further shown in FIG. 1 wireless carrier 103 provides wireless connectivity between wireless device 101 and navigation server 109 to be described further below. Examples of wireless carrier 103 include cellular telephone carriers and satellite communications carriers. In achieving wireless connectivity, wireless carriers provide an existing infrastructure for the wireless devices and distributed navigation servers. Because of the adaptive interaction with the user, information ranging from general to very specific is relayed to the user for a wide range of navigation applications.

While keeping within the teachings of the invention, wireless carrier 103 provides positioning information such as through GPS, E911 or other positioning systems. Alternatively, positioning information is obtained through a third party means and is then used by wireless carrier 103. For example, wireless service resellers, wireless internet service providers (ISPs), or satellite wireless carriers, among others, provide the services necessary to practice the invention. In an embodiment of the invention, wireless carrier 103 receives and transmits analog or digital information from the wireless device 101 and directs such information downstream to other components of the invention. Similarly, wireless carrier 103 receives information from components of the invention and then directs such information to wireless device 101.

As shown in FIG. 1, wireless carrier 103 is connected to gateway 105 which provides an interface to network 107. Gateway 105 is provided by, among others, wireless carriers, ISPs, or other telecommunications providers. In one embodiment of the invention, network 107 is the Internet. The Internet provides advantages because it is a widely distributed network reaching many areas of the world. In another embodiment, network 107 is implemented as a proprietary network. By implementing a specialized network, network 107 may be customized to provide minimal latency and optimal performance.

As shown in FIG. 1, a navigation server 109 is incorporated as-part of the invention by communicating via network 107. Navigation server 109 may comprise street map information, traffic, weather, and other navigation-related as well as points of interest information to facilitate accurate navigation and flexibility. In this manner, wireless device 101 is not burdened with carrying all the necessary information required to process proper navigation. In one embodiment, navigation server 109 also processes location specific information such as real-time traffic information. In an alternative embodiment, traffic information may be obtained from a group of other service providers. By observing and comparing their positions, speeds and times, and making further comparisons with nominal street speed limits in a map database, real-time traffic information is generated and then used by the invention. At each juncture towards a destination, the system dynamically determines the optimal route for a particular user responsive to ever changing conditions. For example, where due to changed conditions a first route becomes less optimal, a second route is generated and presented to a user. An optimal route is determined in several ways depending on a user's preference. For example, an optimal route can be based on minimum time, minimum distance or minimum consumption of fuel.

Figure 2:
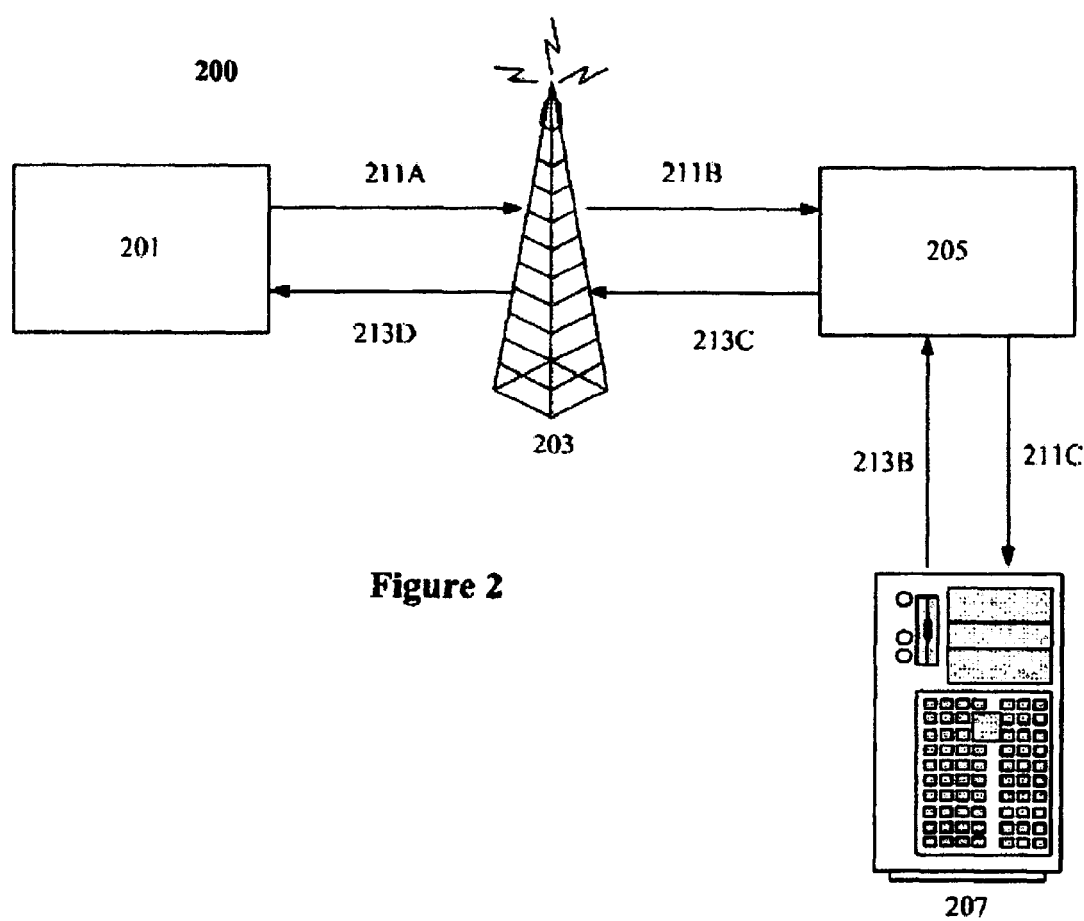
FIG. 2 is an architectural diagram illustrating an alternative embodiment of an interactive real-time distributed navigation system.

An alternative embodiment of the system architecture of the present invention is shown in FIG. 2. As shown in FIG. 2, wireless device 201, wireless carrier 203 and navigation server 207 are substantially similar to their counterparts described in FIG. 1. Direct links 205, however, provide an alternative embodiment to the function of gateway 105 and network 107 of FIG. 1. The direct link architecture is applicable where Internet infrastructure is not well established or fast response is desired for user navigation or other location specific information services. Illustratively, T1, Frame Relay, etc. linked by a LAN or WAN are appropriate for direct link 205. In another embodiment, direct links 205 may be implemented as hard-wired connections between wireless carrier 203 and navigation server 207 where wireless carrier 203 and navigation server 207 are collocated in a central office.

Figure 3:
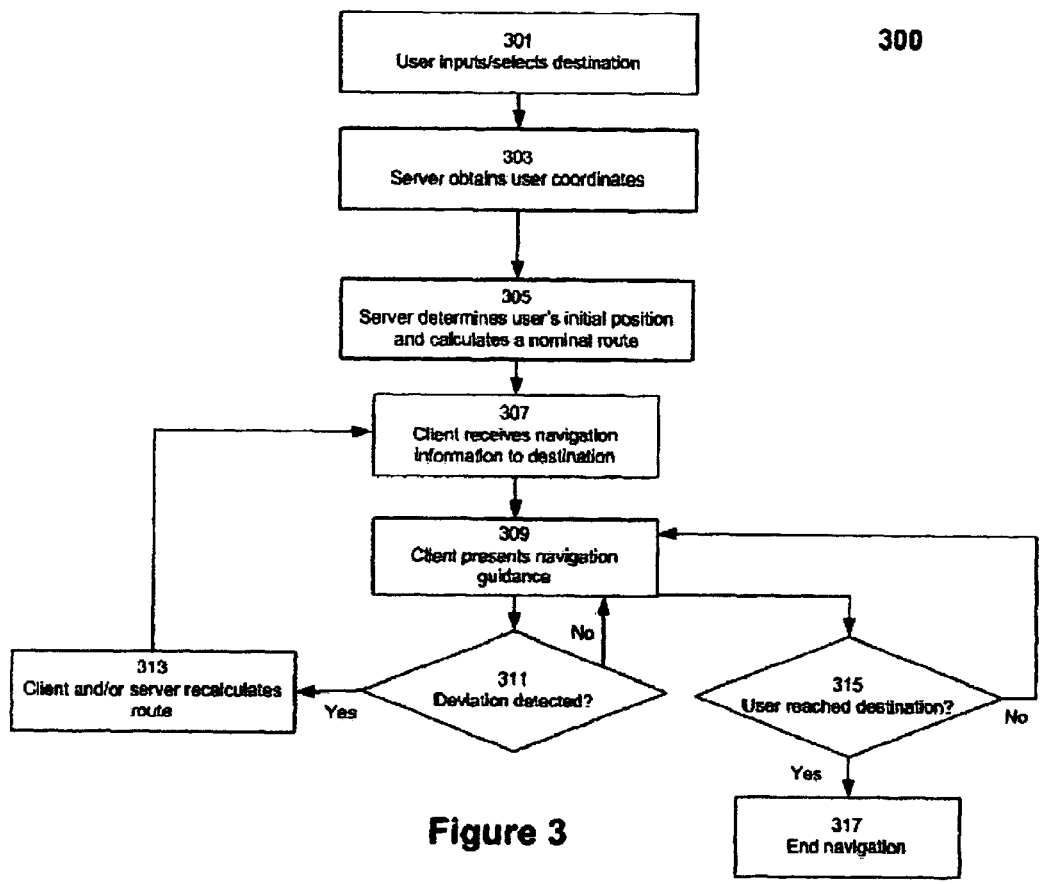
FIG. 3 is an illustrative flow chart showing the steps for communication between client and server in a real-time distributed navigation system according to one embodiment of the present invention.

FIG. 3 is an illustrative flow chart showing the steps for communication between client and server in a real-time distributed navigation system according to one embodiment of the present invention. In step 301, a user inputs a destination to a client wherein the client may be integrated with a mobile communication device (e.g. PDA, cellular telephone, etc.). The destination information may be input by voice, by interfacing with the mobile communication device, or by selecting a location from a stored list of addresses. A voice input may be available in multiple languages and the destination may be selected by various methods. In one embodiment, the user may designate to the client a new destination address by means of an interface attached to the mobile communication device. In an alternative embodiment, the user may select from a list of locations such as a list of the user's most recently used destinations, an address list of the user's frequently used destinations (e.g. office address, home address, etc.), a user recorded, waypoint, or a preplanned trip list that may be stored in the user's preference settings. Moreover, a destination may be a detailed address such as a home address comprising a building number, a street name, a city name, a state, and a zip code; or a significant landmark such as a major highway.

In step 303, a server obtains from the client a set of initial user position information sent along with a request for navigation instructions. In one embodiment, the client comprises a device such as wireless device 101 discussed with reference to FIG. 1. The server comprises a device such as navigation server 109 also discussed with reference to FIG. 1. In one exemplary embodiment, the client queries a positioning system, such as a GPS system or other positioning systems, to acquire the initial position coordinates associated with the user. In step 305, the server determines the user's initial position according to the initial user position information. For additional detail related to determination of user's initial position, refer to co-pending U.S. patent application Ser. No. 10/408,325, entitled "Method and System For Prediction-Based Distributed Navigation", by Chao et al-, filed on Apr. 8, 2003, herein incorporated in its entirety by reference.

Moreover, a position contains various degrees of inaccuracies. For example, most GPS receivers can provide position information accurate to within a range of approximately 50 meters, i.e., an inaccuracy of around 50 meters. There are a number of known factors that may affect the accuracy of a position determination. For instance, weather conditions may affect the accuracy of a GPS position determination. In one embodiment of the invention, a position, in addition to information defining the position of an object, is also associated with an estimated error range. One skilled in the art appreciates that the error of a positioning system is estimated based upon the characteristics of the positioning device and other factors including weather and receiving conditions. Therefore, whether or not a position is ambiguous may be dependent upon many factors including, but not limited to: the accuracy associated with the position; attributes of a road network; recent traveling history; and map accuracy. In one exemplary embodiment, the set of initial user location information indicates an ambiguous user position wherein the user may be situated in one or several possible positions, and the server must resolve the ambiguity before a determination can be made of the user's initial position. For additional detail related to ambiguity determination, ambiguity reduction, and user location selection, refer to issued U.S. patent application Ser. No. 6,266,615 entitled "Method And System For An Interactive And Real-Time Distributed Navigation System" by HaiPing Jin, filed on Jul. 24, 2001, herein incorporated in its entirety by reference.

In another embodiment, the server determines that the user's position does not comprise an actual address. For example, the user may be located in the middle of a parking structure not having its own address. The server may then direct the user by providing directional arrows to a known street before calculating a route to the destination.

Referring now back to step 305, in addition to determining a user's initial position, the server calculates a nominal route from the user's initial position to the destination selected in step 301. For additional detail related to nominal route calculation, refer to co-pending U.S. patent application Ser. No. 10/408,325, entitled "Method and System For Prediction-Based Distributed Navigation", by Chao et al., filed on Apr. 8, 2003, herein incorporated in its entirety by reference. In step 307, the client receives navigation information related to the nominal route from the server.

The amount and/or type of navigation information received in step 307 may depend on factors such as user-designated settings or storage and/or processing capabilities of the client. In one embodiment of the present invention, the client receives navigation information for the entire nominal route from the user's initial position to the destination.

In a second embodiment of the present invention, the client receives navigation information for a partial nominal route. The amount of information received by the client may be a user setting or limited by client storage and/or processing capabilities.

Figure 5:
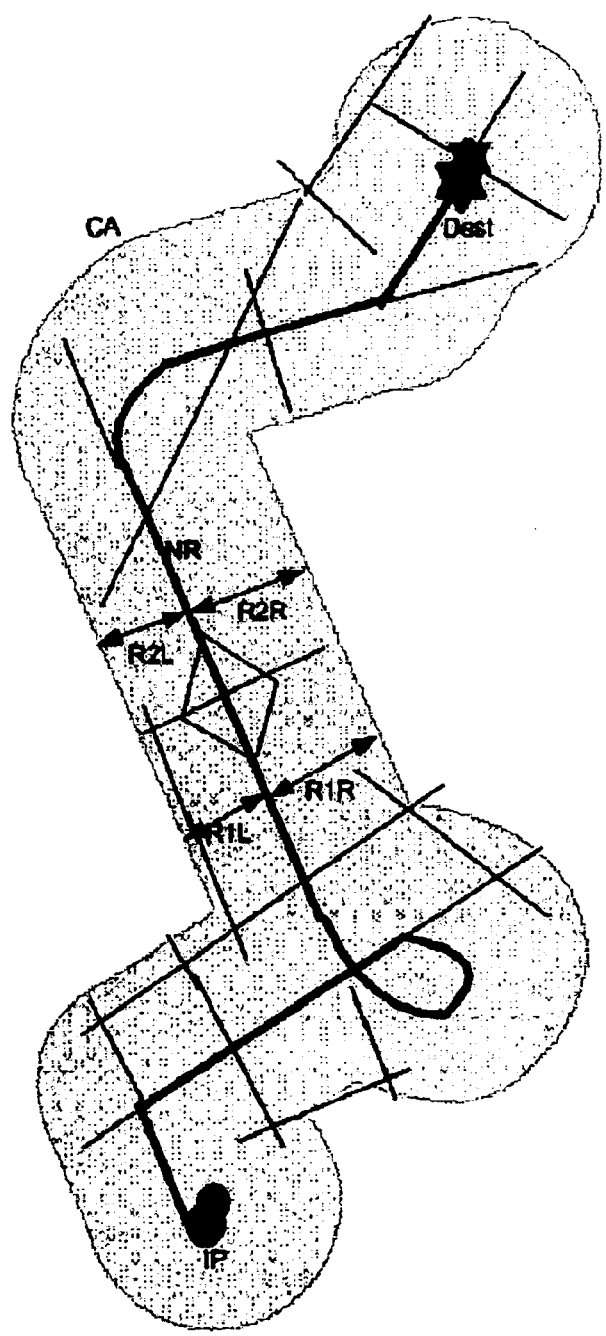
FIG. 5 is a navigation routing diagram illustrating a server-calculated route from a user origin to a destination and a corridor area surrounding the route in which a client is capable of rerouting independently of the server, according to one embodiment of the present invention.

In a third embodiment of the present invention, in addition to information related to the nominal route, the client receives mapping information related to a corridor area surrounding the nominal route. FIG. 5 is an illustration of a nominal route and a surrounding corridor area comprising: a user initial position denoted IP, a destination denoted Dest, a nominal route denoted NR, and a corridor area denoted CA. The corridor area CA comprises an area surrounding the nominal route. In one exemplary embodiment, the corridor area CA is defined by a constant radius on either side of the nominal route NR wherein radius R1L, R1R, R2L, and R2R shown in FIG. 5 are equal regardless of where the radius measurements are made along the nominal route NR. In an alternate embodiment, the corridor area CA is defined by varying distances along the nominal route NR, wherein R1L, R1R, R2L, and R2R shown in FIG. 5 may be four distinct values independent of each another.

Referring now back to step 307 of FIG. 3, the client may receive navigation information comprising nominal route navigation information as well as corridor mapping information in various combinations. In one exemplary embodiment, the client receives navigation information comprising information for the entire nominal route and corridor mapping information along the entire nominal route.

In a second exemplary embodiment, the client receives navigation information comprising the entire nominal route but only partial corridor mapping information along the nominal route. The amount of corridor mapping information received may depend on factors such as user settings or client storage and/or processing capabilities. Moreover, corridor mapping information may not include all streets within the established corridor area, optimizations may be made with techniques such as including only information related to those streets that can provide an alternate route to the destination or can provide a path back to the nominal route once deviation from the nominal route occurs.

In one embodiment, the nominal route may be divided into several sections of constant (e.g. 100 feet per section) or varying (e.g. 50 feet from the user initial position for the first section, 100 feet for the second section, etc.) distances, and the client receives and stores corridor mapping information for the next section at the end of the current section or the beginning of the next section. In an embodiment where the section lengths are not constant, the length of each section may rely on various factors such as the street density of the corridor area surrounding the section. Moreover, regardless of how the nominal route is divided, the client schedules the query of further sections of the route based on factors such as distance consumption and/or user speed. Once the user has traveled into the next section on the route, corridor mapping information for the previous section may be discarded from storage.

In a third embodiment, the client receives navigation information for partial nominal route along with partial corridor mapping information.

Referring now back to step 309 of FIG. 3, having received the navigation information in step 307, the client presents turn-by-turn navigation guidance to the user. For further detail related to navigation message display, refer to issued U.S. patent application Ser. No. 6,266,615 entitled "Method And System For An Interactive And Real-Time Distributed Navigation System" by HaiPing Jin issued on Jul. 24, 2001, herein incorporated in its entirety by reference. In one embodiment, the client provides warnings for upcoming tight turns, the warnings may be triggered by actors such as user travel speed, angle of the turn, etc. In another embodiment, the client provides a dynamic local map via a graphic user interface to the user in order to give the user more comprehensive guidance. Moreover, the client continuously queries a positioning system such as GPS to track the user's position. Based on the user's current position coordinates, the client may determine that the user has reached the destination and announce the appropriate arrival message to the user in step 317.

In step 311, the user's position coordinates may indicate that a deviation from the nominal route has occurred or the user may alert the navigation system that the user has deviated from the calculated route to the destination, and the server and/or the client need to calculate a reroute to the destination in step 313. In one embodiment, a predefined or user and/or system set threshold value is used to determine whether or not the user has deviated from the nominal route. The threshold by which deviation is determined may, vary depending on the area in which the user is traveling. For example, the threshold may be set relatively low in environments that comprise little noise such as a sparsely populated area or a highway where the positioning measurements are relatively reliable; and the threshold may be set relatively high in environments that comprising a lot of noise such as a business district of a downtown urban area where a multitude of high-rise structures may impair the accuracy of the positioning system. In another embodiment, the deviation detection may be a feature set by user preference and can be turned on or off as desired.

Furthermore, reroute calculation may be assigned either entirely to the server, entirely to the client, or divided between the server and the client. Reroute calculation is assigned according to the corridor mapping information stored in the client. In one embodiment, the server is assigned all reroute calculation wherein the corridor mapping information stored in the client does not include a route from the user's current position to the destination, nor does the corridor mapping information include a path from the user's current position back to the nominal route. In a second embodiment, the client is assigned all reroute calculation wherein the corridor mapping information stored in the client does include at least one route from the user's current position to the destination, or at least one route from the user's current position back to the nominal route. In a third embodiment, the client does not have mapping information that would enable a full reroute independent of the server, however, the client calculates a route that leads the user toward the destination simultaneously as it communicates with the server for a full reroute.

In one embodiment, deviation has occurred, the client cannot independently reroute the user to the destination, and there does not exist a network available between the client and the server for communication. The client may then reroute the user back to the nominal route before presenting the client with navigation guidance for the nominal route again.

In another embodiment, the client and/or the server match the deviation to a pattern shown by previous deviations and reroutes according to the established deviation pattern. For example, rather than staying on the calculated route, the user has consistently selected a route parallel to the calculated route, and the client and/or server may then reroute via streets and/or highways parallel to the previous route rather than using the previous route.

Once a new route to the destination has been calculated in step 313, the process loops back to step 307.

Figure 4:
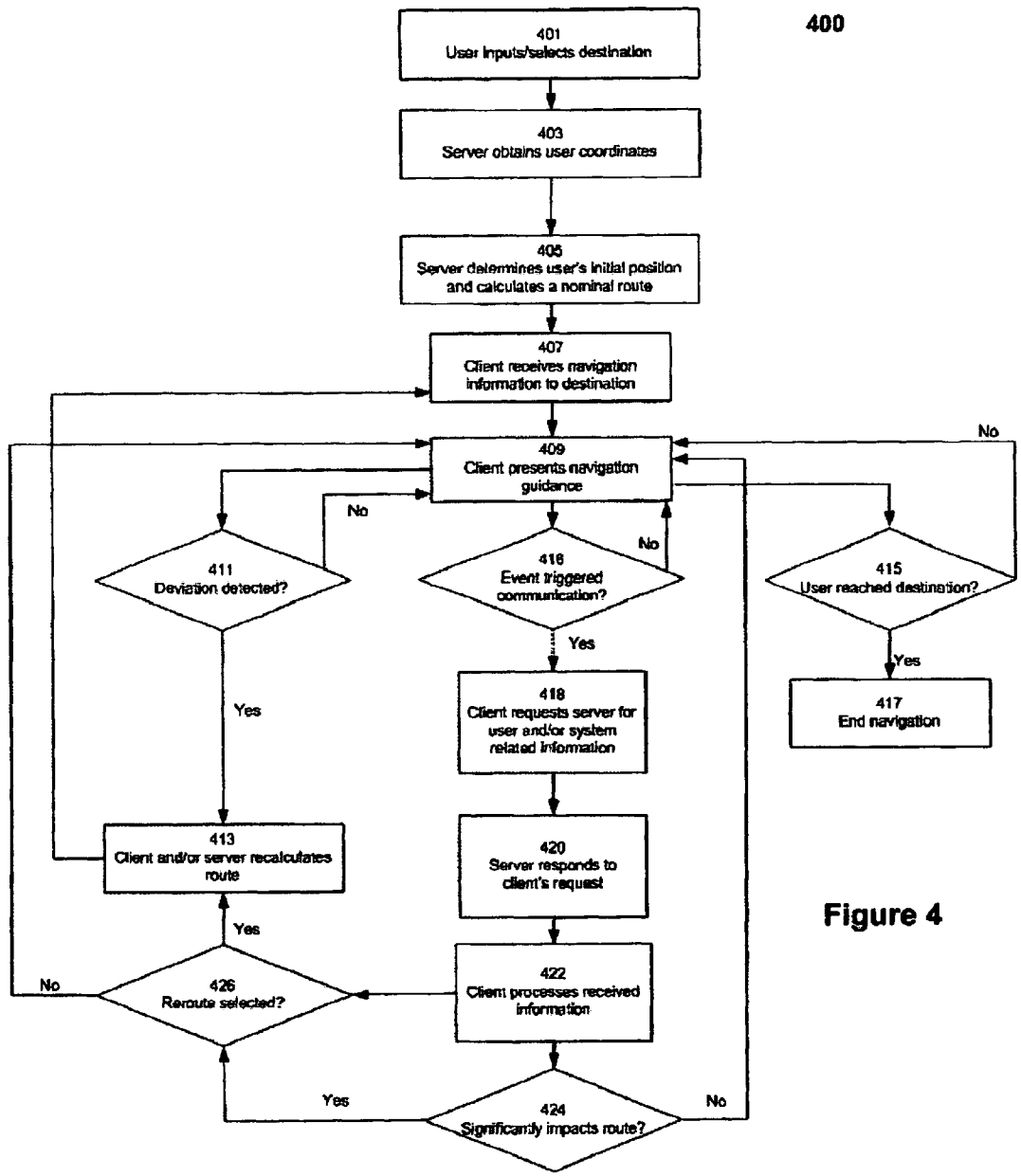
FIG. 4 is an illustrative flow chart showing the steps for communication between client and server in a real-time distributed navigation system according to an alternate embodiment of the present invention.

FIG. 4 is an illustrative flow chart showing the steps for communication between client and server in a real-time distributed navigation system according to a second embodiment of the present invention. As shown in FIG. 4, steps 401–417 are substantially the same as their counterparts in FIG. 3, the client shown in FIG. 4 checks for the occurrence of event triggered communication between the client and the server in addition to determining whether or not the destination has been reached and verifying if a route deviation has occurred.

In step 416, the client determines if a predetermined event set to trigger communication between the client and the server has occurred. A predetermined event may be one of several events such as the need to obtain additional navigation information from the server where the client receives only partial navigation information in step 407, or a periodic event for obtaining navigation and/or other updates (e.g. advertisements, weather, traffic, etc.) related to the calculated route from the server. Moreover, the predetermined event may be preset by the user and/or by the distributed navigation system as default settings.

If a communication is triggered, in step 418, the client sends a request to the server for additional information (e.g. additional route information, additional corridor information, etc.) and/or other updates (e.g. advertisements, weather, traffic, etc.). In step 420, the server responds by sending the requested information to the client. Once the client receives the requested information, it processes the information in step 422.

In one exemplary embodiment, the client processes the received information and determines whether the additional information significantly affects the calculated route to the destination. If the client determines that the received updates do not significantly impact the calculated route, the client processes the update information and loops back to step 409. However, if the client determines that the received updates significantly affect the calculated route (e.g. severe weather conditions, traffic accidents, etc.), the client proceeds to display the relevant update to the user along with a reroute option; In step 426, the client verifies whether the user has selected to reroute in response to the displayed update information. If the user has not chosen to reroute, the client continues to display navigation instructions to the user according to the calculated route. However, if the user does choose to reroute, a new route is calculated in step 413 and the client will then display navigation instructions of the recalculated route to the user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the claims appended hereto and their equivalents.

For example, in a further embodiment, where wireless device 101 is equipped with directional capabilities such as through the use of gyroscope, geomagnetic sensing, or GPS provided heading, the system provides real-time directional as well as navigational information. Illustratively, the system determines that the user must proceed north and the user is facing north, a device displays an upward pointing arrow indicating that the user should proceed straight ahead. However, where the user must proceed north and he is facing south, the device display shows a downward pointing arrow indicating that the user should proceed backward or, more reasonably, turn around to face north and then proceed. In another implementation with a more enhanced display, more detailed and broader map information is displayed with more stylistic prompts to the user.

The invention further allows for the wireless device to be connected to an accessory display. For example, a wireless device 101 appropriate for walking is enhanced by interfacing with a device with additional features such as a car-mounted display or portable computer to become better equipped for automobile navigation. In certain embodiments of the invention, the accessory device provides, without limitation, enhanced display capabilities, enhanced memory capacity, increased computational power, or increased throughput.

Moreover, although steps 311 and 315 illustrated in FIG. 3 are shown to be processed in parallel, the illustration is not meant to be limiting and the steps may be processed in series (the order of which may not be significant) or processed in parallel by multiple threads. Similarly, steps 411, 415, and 416 may be processed in series (the order of which may not be significant) or processed in parallel by multiple threads.

We claim:

1. A distributed navigation system comprising a client and a remote server, wherein a method of providing distributed navigation to a user via the client comprises:

selecting a destination wherein a user selects the destination;

determining a user's initial position via the server;

calculating a nominal route to the destination via the server;

sending information from the server to the client wherein the information comprises navigation information related to the nominal route and mapping information of a corridor area surrounding the nominal route;

providing navigation guidance to the user, wherein the navigation guidance is provided from the client to the user;

sending a request from the client to the server if a predetermined event set to trigger communication between the client and the server occurs;

transmitting additional information from the server to the client in response to the request;

presenting the user with a reroute option generated using the transmitted additional information; and recalculating a new route if the user selects the reroute option.

2. The method of claim 1, wherein the predetermined event is preset by the user, by the distributed navigation system as a default setting or both.

3. The method of claim 1, wherein the predetermined event comprises a periodic event or a scheduled update for client to request server data update or a scheduled update to recalculate the nominal route.

4. The method of claim 1, wherein the user selects the destination from a list of user's most recent destinations a preplanned trip itinerary or an address book list.

5. The method of claim 1, wherein the user's initial position does not constitute a map address.

6. The method of claim 5, wherein the server guides the user to an actual address before calculating the nominal route.

7. The method of claim 1, wherein the server sends routing information for entire nominal route to the client.

8. The method of claim 1, wherein the server sends routing information for a partial nominal route to the client as the user travels along the nominal route.

9. The method of claim 1, wherein the corridor area comprises an area of constant radius on either side of the nominal route.

10. The method of claim 1, wherein the corridor area comprises an area of varying distance on either side of the nominal route.

11. The method of claim 1, wherein the server sends mapping information for the corridor area surrounding the entire nominal route to the client.

12. The method of claim 1, wherein the server sends mapping information for the corridor area surrounding a partial nominal route to the client.

13. The method of claim 12, wherein the client discards mapping information for the corridor area surrounding the partial nominal route as the user travels outside of the partial nominal route.

14. The method of claim 1, wherein the mapping information for the corridor area comprises a set of full map information within a designated area around the nominal route.

15. The method of claim 1, wherein the mapping information for the corridor area comprises a set of selected paths within a designated area around the nominal route.

16. The method of claim 1, wherein the additional information comprises additional route information, additional corridor information, advertisement, weather or traffic data.

17. The method of claim 16, wherein the server automatically initiates the recalculating of the new route independently.

18. The method of claim 17, further comprising the step of sending information comprising navigation information related to the new route or mapping information of a corridor area surrounding the new route from the server to the client.

19. The method of claim 16, wherein the client recalculates the new route independently according to a set of mapping information of the corridor area surrounding the nominal route.

20. The method of claim 19, wherein the client leads the user back to the nominal route.

21. The method of claim 19, wherein the client calculates an alternate new route to the destination according to the mapping information of the corridor area surrounding the nominal route.

22. The method of claim 16, wherein the client guides the user towards the destination concurrently to the client requesting the server to calculate a new route to the destination.

23. A distributed navigation system comprising a client and a remote server, wherein a method of providing distributed navigation to a user via the client comprises:

selecting a destination wherein a user selects the destination;

determining a user's initial position at the server;

calculating a nominal route to the destination via the server;

sending information from the server to the client wherein the information comprises navigation information related to the nominal route;

providing navigation guidance to the user, wherein the navigation guidance is provided from the client to the user;

detecting a communication triggered by a predetermined event between the server and the client; and determining by the client, based on the detected communication, if the nominal route is affected.

24. The method of claim 23, wherein the server sends mapping information for a corridor area surrounding the nominal route to the client along with navigation information for the nominal route.

25. The method of claim 24, wherein the step of determining by the client comprises the step of sending a request for a set of additional information or updates from the client to the server.

26. The method of claim 25, wherein the step of determining by the client further comprises the step of sending the requested set of additional information or updates from the server to the client.

27. The method of claim 26, wherein the step of determining by the client further comprises the step of determining by the client if the set of additional information or updates significantly impacts the route on which the user is traveling towards the destination.

28. The method of claim 27, wherein the set of additional information or updates significantly impacts the route on which the user is traveling.

29. The method of claim 28, further comprising the step of presenting the user with a reroute option.

30. The method of claim 29, wherein the user chooses the reroute option.

31. The method of claim 30 further comprising the step of recalculating a new route to the destination.

32. The method of claim 31, wherein the server initiates recalculating the new route.

33. The method of claim 32, further comprising the step of sending from the server to the client a set of additional information comprising navigation information related to the new route and mapping information of a corridor area surrounding the new route.

34. The method of claim 31, wherein the client recalculates the new route independently according to the mapping information of the corridor area surrounding the nominal route.

35. The method of claim 34, wherein the client leads the user back to the nominal route.

36. The method of claim 34, wherein the client calculates an alternate new route to the destination according to the mapping information of the corridor area surrounding the nominal route.

37. The method of claim 31, wherein the client guides the user towards the destination concurrently to the client requesting the server to calculate a new route to the destination.

38. A distributed navigation system comprising a client and a remote server, wherein a method of providing distributed navigation to a user via the client comprises:

(a) selecting a destination wherein a user selects the destination;

(b) determining the user's initial position at the server;

(c) calculating a nominal route to the destination at the server;

(d) sending a set of information from the server to the client wherein the set of information comprises navigation information related to the nominal route and mapping information of a corridor area surrounding the nominal route;

(e) providing navigation guidance to the user, wherein the navigation guidance is provided from the client to the user;

(f) determining if a predetermined event set to trigger communication between the client and the server occurs;

if the determination at the step (f) is positive;

(g) sending a request from the client to the server for additional information, (h) transmitting the additional information from the server to the client in response to the request, and (i) processing the transmitted additional information to determine if the additional information affects the nominal route, wherein if the nominal route is affected further comprising the steps of presenting the user with a reroute option and calculating a new route upon the users selection of the reroute option; and (j) repeating steps (e)–(i) until the user has reached the destination.

39. A distributed navigation system comprising:

a client for sending a routing request for a set of routing information to a destination, wherein the request comprises sending a set of position coordinates and additional information; and a server for receiving the routing request from the client and in response thereto executing one or more of the following functions: accessing one or more databases, generating a nominal route to the destination according to the set of position coordinates, and sending to the client navigation information of the nominal route along with mapping information for a corridor area surrounding the nominal route, wherein said client is further configured to send an additional request to said server when communication triggered by a predetermined event occurs and said server is further configured to send an additional information to said client in response to the additional request, and wherein said client determines if a new route is needed based on the additional information.

40. The distributed navigation system of claim 39, further comprising a wireless carrier coupled to the client for receiving the routing request from the client and also coupled to the server for relaying the routing request from the client to the server.

41. The distributed navigation system of claim 40, further comprising one or more direct links coupled to the wireless carrier to receive the routing request from the wireless carrier and also coupled to the server for relaying the request from the wireless carrier to the server.

42. The distributed navigation system of claim 40, further comprising a gateway coupled to the wireless carrier for receiving the routing request from the wireless carrier and also coupled to the server for relaying the routing request from the wireless carrier to the server.

43. The distributed navigation system of claim 42, further comprising a network coupled to the gateway for receiving the routing request from the gateway and also coupled to the server for relaying the routing request from the gateway to the server.

44. A distributed navigation system comprising:

a server for receiving a navigation request, accessing one or more databases, generating a nominal route to the destination according to the set of position coordinates, and sending navigation information of the nominal route along with mapping information for a corridor area surrounding the nominal route to the client; and a client for receiving the navigation information of the nominal route and mapping information for the corridor area surrounding the nominal route from the server, wherein said client is further configured to send an additional request to said server when communication triggered by a predetermined event occurs and said server is further configured to send an additional information to said client in response to the additional request, and wherein said client determines if a new route is needed based on the additional information.

45. The distributed navigation system of claim 44, further comprising one or more direct links coupled to the server for receiving the navigation information and the mapping information, and also coupled to the client for relaying the routing directions.

46. The distributed navigation system of claim 45, further comprising a wireless carrier coupled to the direct links for receiving the navigation information and the mapping information, and also coupled to the client for relaying the routing directions.

47. The distributed navigation system of claim 44, further comprising a network coupled to the server for receiving the navigation information and the mapping information, and also coupled to the client for relaying the routing directions.

48. The distributed navigation system of claim 47, further comprising a gateway coupled to the network for receiving the navigation information and the mapping information, and also coupled to the client for relaying the routing directions.

49. The distributed navigation system of claim 48, further comprising a wireless carrier coupled to the gateway for receiving the navigation information and the mapping information, and also coupled to the client for relaying the routing directions.

* * * * *